United States Patent [19]

Barry et al.

[11] Patent Number: 5,812,719
[45] Date of Patent: Sep. 22, 1998

[54] SHEATH FOR A FLEXIBLE FIBER OPTIC LIGHTGUIDE, AND THE LIGHTGUIDE

[75] Inventors: James P. Barry, Charlton, Mass.; David J. Guerra, Putnam, Conn.; David V. Payeur, Southbridge, Mass.

[73] Assignee: Karl Strorz GmbH & Co., Tuttlingen, Germany

[21] Appl. No.: 611,541

[22] Filed: Mar. 6, 1996

[51] Int. Cl.$^6$ ........................................ G02B 6/04
[52] U.S. Cl. ............................ 385/115; 385/117
[58] Field of Search ........................ 385/100, 102, 385/103, 109, 113, 115, 116, 117

[56] References Cited

U.S. PATENT DOCUMENTS

| | | | |
|---|---|---|---|
| 4,375,313 | 3/1983 | Anderson et al. | 385/103 |
| 4,750,805 | 6/1988 | Vaderwall | 385/102 |
| 4,784,464 | 11/1988 | Ouchi | 385/117 |

*Primary Examiner*—John D. Lee
*Attorney, Agent, or Firm*—Donald D. Mon

[57] ABSTRACT

A lightguide including a bundle of optical fibers, and a sheath surrounding said bundle. The sheath is a stiffly flexible tube which has an uncut length adjacent to one of its ends, and a helical cut through its wall extending away from the uncut length. The bundle is held to the uncut length, and fits loosely in the cut length, the fibers being free from one another in the uncut length.

2 Claims, 2 Drawing Sheets

SHEATH FOR A FLEXIBLE FIBER OPTIC LIGHTGUIDE, AND THE LIGHTGUIDE

FIELD OF THE INVENTION

A sheath for flexible fiber optic lightguides of the type used in endoscopy, and a lightguide which includes a bundle of optical fibers enclosed by the sheath.

BACKGROUND OF THE INVENTION

Intense light is conveyed by small bundles of fine optical fibers to illuminate cavities of interest during endoscopic procedures. Typically such bundles include hundreds of fibers whose diameters are measured in microns. The efficiency of the lightguide in transmitting the light is, of course, heavily dependent on the continuity of the fibers. When a fiber breaks it no longer conducts the light efficiently if at all, and the efficiency of the lightguide is proportionally reduced.

It is an object of this invention to reduce the tendency of the fibers to break when the lightguide is flexed. Flexure of the lightguide is required, except in rigid endoscopes, and the number of flexures rapidly increases with the use of the instrument.

It is unacceptable for fibers of this type to be unconfined. In the prior art, a rather loose-fitting flexible cylindrical sleeve has been used to keep the fibers in at least a semblance of order. Unfortunately such a cylinder itself undergoes undesirable abrupt changes in shape such as kinks during bending motion, which causes breakage of the fibers. In fact in many such lightguides deterioration from fiber breakage begins at about 1,000 bending cycles and accelerates at about 2,000 cycles. The lightguide loses about half of its efficiency at about 5,000 cycles, and becomes useless at about 7,500 cycles.

In contrast, lightguides according to this invention fully maintain their efficiency through at least 10,000 cycles. The economic savings and the improvement in function over the full life of the product are evident.

When a continuous cylindrical sheath must be pulled over a bundle of fine fibers, some breakage of fiber is inevitable. This invention provides a sheath which can be applied to a bundle of fibers, with a reduced number of broken fibers caused by the assembly process.

It is another object of this invention to provide a sheath which at least at one of its ends does not require a separate end tip for the fibers. Instead, only one end, usually the proximal end of the bundles of fibers, is adhered to an unslit end of the sheath, and the fibers in the slitted portion are free to slip within it, without crimping forces that could break fibers.

BRIEF DESCRIPTION OF THE INVENTION

A fiber optic bundle comprises a plurality of parallel optical fibers assembled in a group which extends from one end of the bundle to the other. A sheath according to this invention extends from end to end of the bundle, and includes an integral helix over a major portion of its length. The helix closely but loosely encircles the group of fibers. At least one end of the helix terminates in an integral tubular sleeve which is adhered to or attached to the group of fibers to hold their ends in place.

According to a preferred feature of the invention, the helix is formed by making a helical cut in a continuous tube, thereby enabling the helix to be applied to the group merely by wrapping it on, instead of pulling it on or pulling the fibers through it.

According to an optional feature of the invention, the pitch of the helical cut can be varied to provide different degrees of flexibility along its length.

According to yet another optional feature of the invention, the helical cut may involve removal of material to facilitate bending of the bundle assembly.

The above and other features of the invention will be fully understood from the following detailed description and the accompanying drawings, in which:

DETAILED DESCRIPTION OF THE INVENTION

Figure 1:
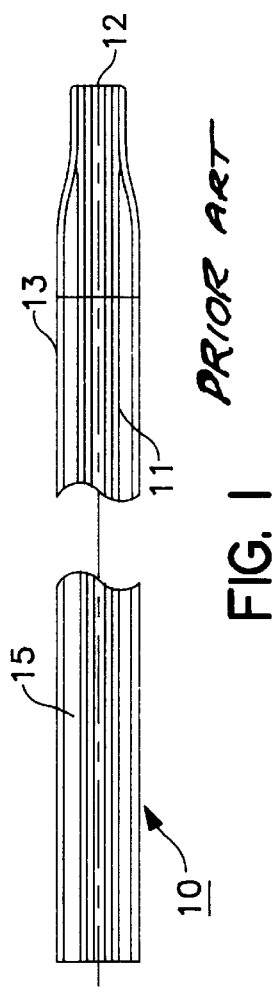
FIG. 1 is an axial cross-section of a prior art lightguide.

A prior art fiber optic bundle 10 is shown in FIG. 1. It includes a group 11 of parallel optical fibers extending from one end 12 to another end (not shown). A sheath 13 is drawn over the bundle, and its continuous cylindrical wall extends toward the other end, enclosing the group of fibers. Notice that it has an enlarged internal diameter which leaves an annular clearance 15 between it and the group of fibers.

Figure 2:
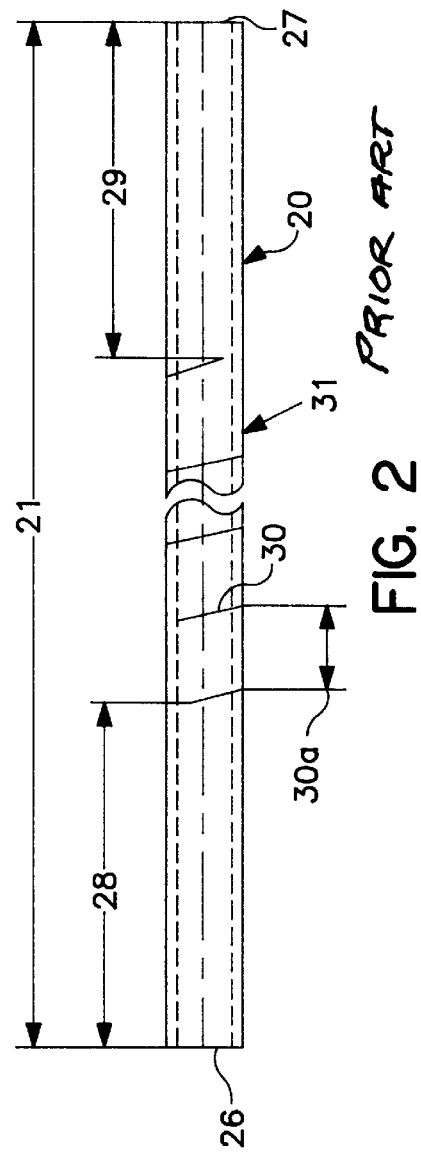
FIG. 2 is a side view of a helically cut tubing used to form a sheath in this invention.
Figure 3:
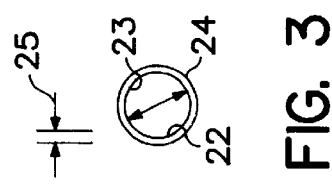
FIG. 3 is an end view of FIG. 2.

The presently-preferred sheath 20 according to this invention is shown in FIGS. 2 and 3. It is an initially continuous length of tubing having a dimension of length 21, a cylindrical passage 22 bounded by an inside wall 23, an outside wall 24, and a wall thickness 25. It is preferably made of a stiffly flexible plastic material such as polyimide.

From at least one of its ends 26 preferably the distal end, there extends a short length 28, of continuous uncut tubing. If desired, such an uncut portion can be provided at the proximal end, but usually will not. Between them, the tubing is cut from length 28 by a helical cut 30, to form a helix 31. The helix will extend for the major portion of the length of the sheath.

For example, an unstressed sheath with a length about 90.0 mm will have an uncut length 28 about 4.0 mm long. A typical outer diameter will be about 0.800 mm, with a wall thickness about 0.075 mm. The pitch 30a of the helix will be about 1.00 mm.

A typical bundle 31 (FIG. 4) of optical fibers will include about 450 fibers each with a diameter of about 0.700 mm. The fibers will occupy about 75% of the cross-section of the passage.

This is a close, but not a tight fit, thereby enabling the fibers to slide past one another with ease, and to change their radius of curvature without sharp bends that would tend to snap the fibers. Any necessary reduction in the cross-section of the inner wall will be gradual, and there is sufficient looseness of fit that the fibers will not be unduly constricted. This looseness of fit also enables the bundle of fibers easily to be inserted into the uncut end or ends of the sheath.

Figure 4:
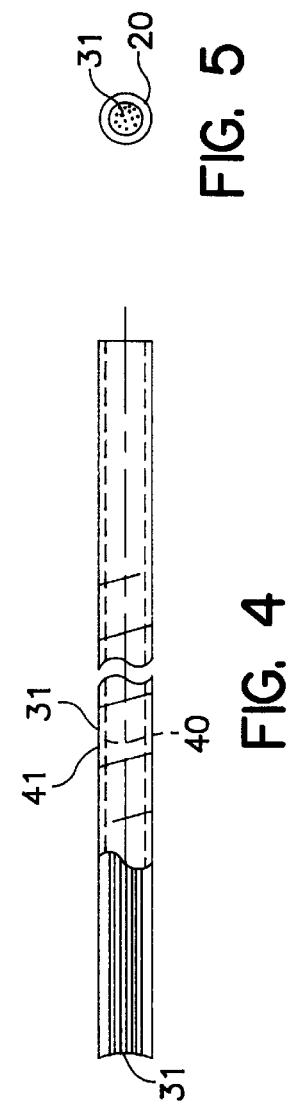
FIG. 4 is a side view partially in axial cutaway cross-section showing the tubing of FIG. 2 applied to a group of fibers to form the lightguide.

FIG. 4 shows sheath 20 applied to bundle 31. If desired, the uncut end or ends of the sheath and the fibers can be bonded together by an epoxy, or the uncut ends can be drawn down onto the fibers to hold them. If desired the fibers may extend beyond the sheath to be fitted to a connector. A metal end tip (not shown) will often be placed over the distal end of the lightguide.

This invention relates only to the sheath portion of the lightguide, which usually will comprise a subcombination of another device or system. It may extend for substantially the entire length of the lightguide, or may be a separate portion in an end or center region.

In the preferred embodiment, the helical cut will be made by a blade without removal of material. For some applications, removal of some material may be desired, such as by making a laser cut or a saw cut. In this way the sheath may be made more flexible. Also, the pitch of the cut may be varied along the sheath, in order to provide different flexural properties along the length of the lightguide.

The application of this sheath to the bundle of fibers is straight-forward. One uncut end is placed over the bundle, and then the helix is wrapped around the bundle until the other end is reached which may or may not be uncut. The bundle is passed through this uncut end if such exists, or the fibers may pass directly from the sheath to an end fitting without being bonded to this end of the sheath.

When the resulting lightguide is bent, the abutting faces 40, 41 of the helical cut are able to shift relative to one another, which enables the sheath and the fibers to bend and the fibers to slip relative to one another without kinking or other abrupt deformation. The consequences of this accommodation are surprising and extraordinary.

Figure 5:
FIG. 5 is an end view of FIG. 4.
Figure 6:
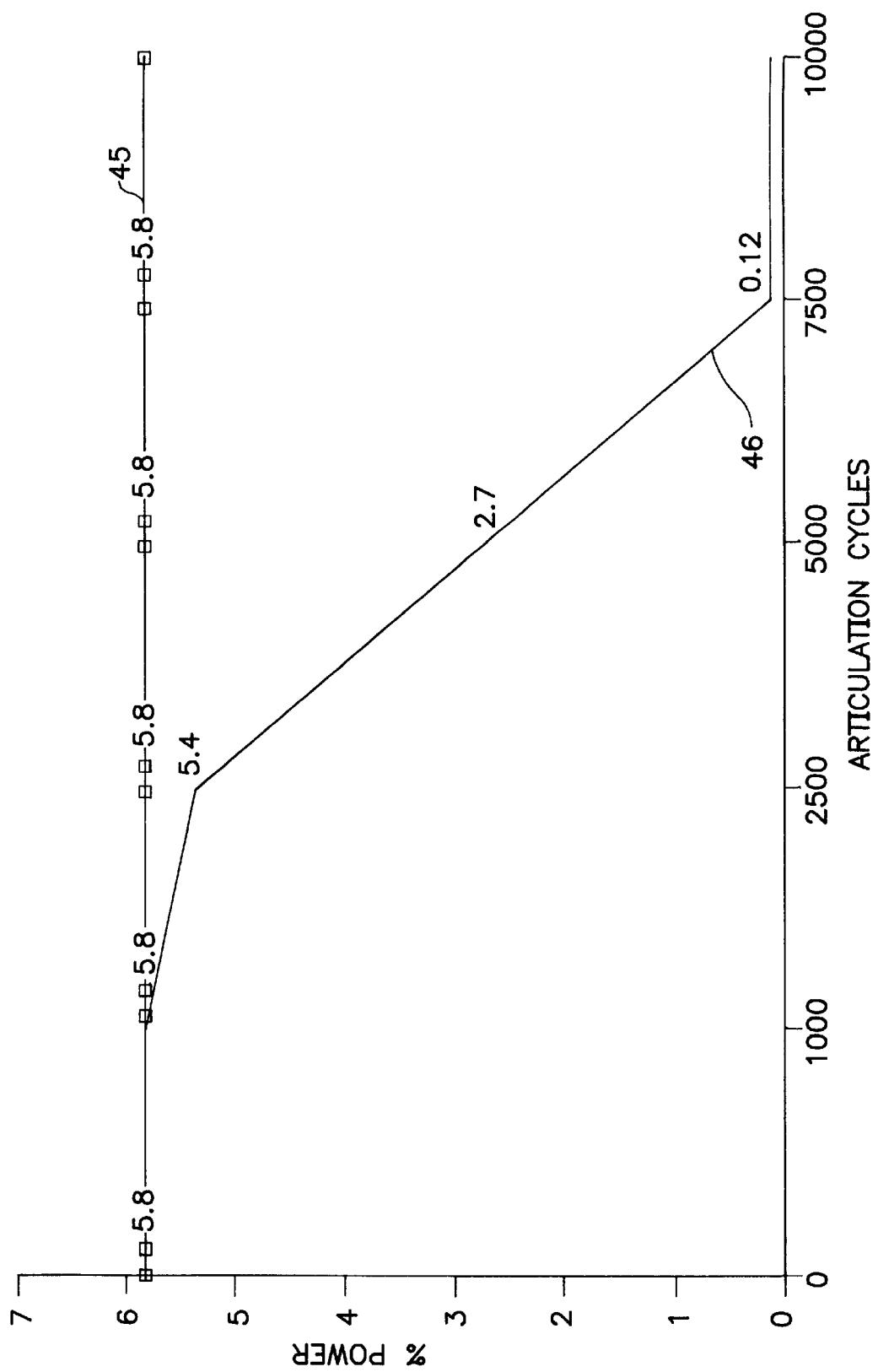
FIG. 6 is a graph showing the improved longevity of a lightguide according to this invention compared to the prior art embodiment of FIG. 1.

FIG. 5 is a graph showing the substantially constant efficiency of a lightguide according to this invention (line 45), and the seriously deteriorating efficiency of a lightguide according to FIG. 1 (line 46).

The longevity provided by this invention extends the useful lifetime of a flexible endoscope when a covered lightguide is used as a sub-assembly.

This invention is not to be limited by the embodiment shown in the drawings and described in the description, which is given by way of example and not of limitation, but only in accordance with the scope of the appended claims.

We claim:

1. In combination:
   a hollow sheath having a nominal dimension of length, an internal passage, an internal wall having a nominal diameter, an external wall having a nominal diameter, and a wall thickness, said sheath having a first end and a second end, adjacent to at least one of said ends there being an uncut length, and there being a helical cut between the said walls extending from the uncut end to form a stiffly flexible helix;
   a bundle of generally parallel individual flexible optical fibers, said bundle being contained in said internal passage, which fits loosely between its fibers and said internal wall in the length having the helical cut, and said fibers held to said uncut length, said fibers being free from one another except at said uncut length.

2. A combination according to claim 1 in which said hollow sheath is cylindrical.

* * * * *

UNITED STATES PATENT AND TRADEMARK OFFICE
CERTIFICATE OF CORRECTION

PATENT NO. : 5,812,719
DATED : September 22, 1998
INVENTOR(S) : James P. Barry

It is certified that error appears in the above-identified patent and that said Letters Patent is hereby corrected as shown below:

<u>Title page,</u>
Item [73], should read as follows:
-- [73] Assignee: Karl Storz GmbH & Co., Tuttlingen, Germany --

Signed and Sealed this

Seventh Day of May, 2002

*Attest:*

*Attesting Officer*

JAMES E. ROGAN
*Director of the United States Patent and Trademark Office*